(12) United States Patent
Zhang et al.

(10) Patent No.: US 10,520,632 B2
(45) Date of Patent: Dec. 31, 2019

(54) ROTATING MAGNETIC FIELD RANGE FINDER AND ITS MEASUREMENT METHOD FOR RELATIVE SEPARATION BETWEEN DRILLING WELLS

(71) Applicant: BEIJING NANO TESLA TECHNOLOGY CO. LTD, Beijing (CN)

(72) Inventors: Yue Zhang, Beijing (CN); Yuan Lin, Beijing (CN); Chenxiao Cao, Beijing (CN); Panpan Li, Beijing (CN)

(73) Assignee: BEIJING NANA TESLA TECHNOLOGY CO. LTD, Beijing (CN)

( * ) Notice: Subject to any disclaimer, the term of this patent is extended or adjusted under 35 U.S.C. 154(b) by 303 days.

(21) Appl. No.: 15/510,353

(22) PCT Filed: Jun. 12, 2015

(86) PCT No.: PCT/CN2015/081310
§ 371 (c)(1),
(2) Date: Sep. 21, 2017

(87) PCT Pub. No.: WO2016/037505
PCT Pub. Date: Mar. 17, 2016

(65) Prior Publication Data
US 2018/0038984 A1    Feb. 8, 2018

(30) Foreign Application Priority Data
Sep. 10, 2014  (CN) .......................... 2014 1 0456837

(51) Int. Cl.
*G01V 3/26* (2006.01)
*E21B 47/022* (2012.01)
(Continued)

(52) U.S. Cl.
CPC .......... *G01V 3/26* (2013.01); *E21B 47/02216* (2013.01); *G01B 7/14* (2013.01); *E21B 7/04* (2013.01); *E21B 43/2406* (2013.01)

(58) Field of Classification Search
CPC ... G01V 3/26; E21B 47/022; E21B 47/02216; E21B 7/04; E21B 43/2406; G01B 7/14
(Continued)

(56) References Cited

U.S. PATENT DOCUMENTS 5,585,726 A * 12/1996 Chau ..................... G01V 3/26
                                                         324/326
5,589,775 A * 12/1996 Kuckes ............. E21B 47/02216
                                                         166/66.5
(Continued)

FOREIGN PATENT DOCUMENTS

CN      1966935 A      5/2007
CN    101806210 A      8/2010
(Continued)

*Primary Examiner* — Patrick Assouad
*Assistant Examiner* — Sean Curtis
(74) *Attorney, Agent, or Firm* — Kenneth L. Green; Averill & Green

(57) ABSTRACT

A rotating magnetic field range finder for measuring relative distance in drilling, comprising a permanent magnet steel drill collar (1), an underground detector (2) and a ground interface box (3). The permanent magnet steel drill collar (1) is fixed to the rear part of a drill bit and rotates together with the drill bit to generate a rotating magnetic field to provide a magnetic field signal source. The underground detector (2) comprises two tri-axial fluxgates and three accelerometers. The ground interface box (3) is used for processing the obtained data, and powering the underground detector. The permanent magnet steel drill collar (1) is an obliquely
(Continued)

arranged one or a perpendicularly-and-parallelly assembled one. A measuring method for magnetic range measurement is also disclosed.

15 Claims, 11 Drawing Sheets

(51) Int. Cl.
  *G01B 7/14* (2006.01)
  *E21B 7/04* (2006.01)
  *E21B 43/24* (2006.01)

(58) Field of Classification Search
  USPC .................................................. 324/323–375
  See application file for complete search history.

(56) References Cited

U.S. PATENT DOCUMENTS

| | | | | |
|---|---|---|---|---|
| 5,676,212 | A * | 10/1997 | Kuckes | E21B 7/04 166/66.5 |
| 7,321,293 | B2 * | 1/2008 | Kennedy | E21B 47/0905 340/385.1 |
| 7,656,161 | B2 * | 2/2010 | McElhinney | E21B 47/02216 324/346 |
| 8,058,882 | B2 * | 11/2011 | Hernandez-Marti | G01R 31/021 324/303 |
| 8,063,641 | B2 * | 11/2011 | Clark | E21B 47/02216 324/345 |
| 8,294,468 | B2 * | 10/2012 | Reiderman | E21B 47/0905 175/45 |
| 8,322,462 | B2 * | 12/2012 | Kuckes | E21B 47/02216 175/41 |
| 8,596,382 | B2 * | 12/2013 | Clark | E21B 47/02216 166/66.5 |
| 8,810,247 | B2 * | 8/2014 | Kuckes | E21B 47/02216 324/346 |
| 8,912,915 | B2 * | 12/2014 | Hay | G01V 11/002 340/853.1 |
| 8,952,700 | B2 * | 2/2015 | Wisler | E21B 47/02216 175/45 |
| 8,991,519 | B2 * | 3/2015 | Kuckes | E21B 47/02216 175/41 |
| 9,027,670 | B2 * | 5/2015 | Sugiura | E21B 7/04 175/24 |
| 9,151,150 | B2 * | 10/2015 | Fang | E21B 47/0905 |
| 9,273,547 | B2 * | 3/2016 | Brooks | E21B 47/022 |
| 9,297,249 | B2 * | 3/2016 | McElhinney | E21B 47/02224 |
| 9,400,339 | B2 * | 7/2016 | Bloemenkamp | G01V 3/24 |
| 9,534,488 | B2 * | 1/2017 | Derr | E21B 47/01 |
| 9,982,525 | B2 * | 5/2018 | Brooks | E21B 47/022 |
| 9,983,276 | B2 * | 5/2018 | Stokely | G01R 33/26 |
| 10,119,389 | B2 * | 11/2018 | Donderici | E21B 43/305 |
| 10,190,405 | B2 * | 1/2019 | Hay | G01V 11/002 |
| 10,202,841 | B2 * | 2/2019 | Zhang | E21B 47/024 |
| 10,267,142 | B2 * | 4/2019 | Pan | E21B 47/02216 |
| 2008/0041626 | A1 * | 2/2008 | Clark | G01V 3/26 175/45 |
| 2010/0155139 | A1 * | 6/2010 | Kuckes | E21B 47/02216 175/45 |
| 2012/0139530 | A1 * | 6/2012 | McElhinney | E21B 47/02216 324/207.13 |
| 2012/0193144 | A1 * | 8/2012 | Hallundbæk | E21B 7/04 175/45 |
| 2012/0194195 | A1 * | 8/2012 | Wisler | E21B 47/02216 324/346 |
| 2013/0069655 | A1 * | 3/2013 | McElhinney | G01V 3/26 324/346 |
| 2014/0111210 | A1 * | 4/2014 | Fang | E21B 47/0905 324/346 |
| 2015/0204996 | A1 * | 7/2015 | Dashevsky | E21B 43/20 324/324 |
| 2017/0009566 | A1 * | 1/2017 | Fan | E21B 43/305 |
| 2017/0138173 | A1 * | 5/2017 | Estes | E21B 7/04 |
| 2018/0038984 | A1 * | 2/2018 | Zhang | E21B 47/022 |
| 2018/0334899 | A1 * | 11/2018 | Wilson | E21B 47/022 |

FOREIGN PATENT DOCUMENTS

| | | | |
|---|---|---|---|
| CN | 102782250 A | 11/2012 | |
| CN | 104343438 A | 2/2015 | |
| WO | WO 2009/151835 | 12/2009 | |
| WO | WO-2009151835 A1 * | 12/2009 | ....... E21B 47/02216 |
| WO | WO-2016037505 A1 * | 3/2016 | ........... E21B 47/022 |

\* cited by examiner

őzik
ROTATING MAGNETIC FIELD RANGE FINDER AND ITS MEASUREMENT METHOD FOR RELATIVE SEPARATION BETWEEN DRILLING WELLS The present application claims the priority of Chinese Patent CN104343438A filed Sep. 10, 2014 and PCT Application Serial No. PCT/CN2015/081310, filed Jun. 12, 2015, which applications are incorporated by reference in their entirely.

FIELD OF THE INVENTION

The present Invention relates to a magnetic field range finder and its measurement method, more specifically, to a rotating magnetic field range finder and its measurement method for relative separation between drilling wells.

BACKGROUND OF THE INVENTION

With MWD (Measurement While Drilling or Measure While Drilling) method, the directional and horizontal wells, and other wells with three-dimensional well placement can be achieved. However, for more than two wells of three-dimensional well placement, such as intersection wells, paralleling wells or 3D sidetrack wells, the ellipse uncertainty of MWD will increase as well as the well gets deeper, cumulative errors of MWD will exceed tolerances. If only MWD is used, it is difficult to provide a sufficiently accurate relative distance for wells. Therefore, you need to measure the relative distance between the drill bit and the drilled well, to eliminate the accumulated error of the MWD method.

In the prior art, a magnetic field range finder method is mostly used for achieving a measurement of relative distance. The magnetic field source comprises a magnetic field of a magnetized casing of the drilled well, a magnetic field generated by current in a solenoid of the drilled well, and a magnetic field of permanent magnets mounted on the drilling bit. Magnetic field intensity is weaker by the distance in cubic attenuation. A sensitive distance of permanent magnet is farther than a solenoid, and sensitive distance of the solenoid is farther than the magnetized casing, so the permanent magnet is the most practical and applicable. A permanent magnet as source approach has been successfully used in many applications, such as heavy oil SAGD wells, heavy oil THAI wells, coal bed methane intersection wells, underground coal gasification "U" shape wells and "V" shape cluster wells, mining emergency rescue drilling, freeze hole drilling in ground freezing construction, offshore platforms multi-wells drilling, horizontal directional drilling for pipeline construction, saline mine connection wells, other obstacles. What is needed is a focus on improved permanent magnet-based ranging, in order to increase measurement distance and improve measurement reliability.

For example, U.S. Pat. No. 5,258,755 uses the permanent magnet with NS pole perpendicular to the axis of the drill bit and a solenoid with its NS polar axis parallel to the axis of the drill bit, the solenoid is energized, but in practice, it is difficult to achieve, the solenoid should be replaced with a permanent magnet. In U.S. Pat. No. 5,258,755 the solenoid is connected with alternating current to generate an alternating magnetic field. The permanent magnet magnetic field is also variable with bit rotation.

Chinese Patent No. CN101799558B proposed using two induction magnetometers, to form a synchronized three component magnetic field measurements of space in two locations. An induction magnetometer measures the rotation of the rotating magnetic field generated by the magnet. Another induction magnetometer to measure the Earth's magnetic field, together with the accelerometer to establishing the Earth's gravity and terrestrial magnetic field coordinates. However, this method is not high precision.

U.S. Pat. No. 5,589,775 and Lee proposed a dipole magnetic field distribution to calculate distance, but the dipole magnetic field distribution is interfered by a drill bit and mud motor and permeability of the target well, will affect the calculate accuracy of distance.

Patent U.S. Pat. No. 5,485,089 proposed using a movable solenoid to generate the magnetic field in the drilled well. Patent CN101852078B proposed using two solenoids to generate the magnetic field in the drilled well, and measured with MWD fluxgate. But MWD fluxgate is far from the drill bit and measuring data is too limited, As well as MWD cannot performance under normal circumstances.

There is a need to overcome the disadvantages of the prior art magnetic field measurements, to avoid the accumulation of errors and to improve the accuracy of measurement between the drill bit and target relative distance.

BRIEF SUMMARY

The object of the present invention is to provide a rotating magnetic field range finder for measuring the relative distance between drilling wells and its measuring method to accurately measure the relative position of the drill bit and the target point.

To fulfill the object, the present invention uses the technical solution described below.

A rotating magnetic field range finder for measuring the relative distance between drilling wells, includes a permanent magnet drill collar sub, a downhole sensor tool, and a surface interface gear, wherein:

The permanent magnet drill collar sub assembly (hereafter permanent magnet drill collar sub) comprises a drill collar sub body, a plurality of permanent magnets which are assembled within the body. The permanent magnet drill collar sub is located in the rear of the drill bit, becomes a rotating magnetic field sub, which rotates together with the drill bit to generate the rotating magnetic field for providing the magnetic field signal source.

The downhole sensor tool includes two tri-axial fluxgate magnetometers and three accelerometers. The two tri-axial fluxgate magnetometers are separated by a certain distance and are able to measure rotating magnetic field in two locations. Accelerometers and fluxgate magnetometers work together to establish a coordinate system for the two fluxgate magnetometers in the Earth's gravity field and the Earth's magnetic field.

The surface interface gear is used for data transfer, and to supply power to downhole sensor tool, The downhole sensor tool and surface interface gear are connected with a cable for data transfer and power supply.

Preferably, the permanent magnets are all obliquely assembled or partial perpendicular and are partial parallel assembled within permanent magnet drill collar sub.

In the instance of the obliquely assembled permanent magnet drill collar sub, all of the permanent magnets are arranged in a vector from N pole to S pole in a certain angle to the sub axis.

In the instance of the partial perpendicular and partial parallel assembled permanent magnet drill collar sub, a part of permanent magnets arranged in a vector from N pole to S pole perpendicular to the sub axis, and another part of the permanent magnets arranged in a vector from N pole to S pole parallel to the sub axis.

Preferably, the downhole sensor tool includes a two sensor modules, a CPU module, and a power module, wherein the two sensor modules are designed in a certain distance, each sensor module consists of three mutually perpendicular gravity accelerometer and one high-precision tri-axis fluxgate sensor, the function of three accelerometers is to determine inclination and gravity high side tool-face which can establish a coordinate system for the two tri-axial fluxgate magnetometers. The tri-axial fluxgate magnetometers are used for measuring the rotating magnetic field components in the coordinate system at the center of the fluxgate magnetometers; the power module obtains electrical power by the cable, and also transmits data by the cable; the CPU module samples sensor voltage and transmits the sampled voltage data of the two sensor modules to the power supply module.

Preferably, the cable is a single core steel armored cable.

The present invention also discloses a measurement method with above-described rotating magnetic field range finder to measure the relative distance of the drilling wells.

The permanent magnet drill collar sub is located on the drill bit and it rotates together with the drill bit to generate magnetic field for providing the magnetic field signal source. The downhole sensor tool is placed in another drilling well, and it measures each component of rotating magnetic field at the position of the downhole sensor tool.

By using the time waveform of fluxgate and time waveform of depth, now we build 3D images which presents RMtop1, RMside1, RMforward1, (hereafter RMforth1), RMtop2, RMside2, RMforward2 (hereafter RMforth2) six magnetic field components versus the bit rotation angle and bit depth. Now we can get separation and direction between the bit and drilled well by reading coordinate values of the peak, valley and isoline correspond with drill bit rotation angle and bit depth. Based on functions of separation and direction between the bit and drilled well to the drill bit rotation angle and the bit depth, based on magnetic field components at the position of each fluxgate, based on each component calculated by calibration files.

Wherein RMforth is the rotation axis direction of the permanent magnet drill collar sub, and RMtop is the direction from the RMforward (hereafter RMforth) axis to the observation point, RMside direction is according to the right-hand rule.

Preferably, the calibration file refers to the correlation coefficient file for calibrating with distorted magnetic field, then the calibration file and the 3D image characteristics are working together to determine separation and direction.

Preferably, the obliquely assembled permanent magnet drill collar sub, the function is:

$$\begin{cases} JRMtop = \dfrac{\mu M}{4\pi(h^2 + s^2)^{2.5}} \\ ((2s^2 - h^2)\cos\beta\cos\alpha + 3hs\sin\beta) \\ JRMside = \dfrac{\mu M}{4\pi(h^2 + s^2)^{1.5}}\cos\beta\sin\alpha \\ JRMforth = \dfrac{\mu M}{4\pi(h^2 + s^2)^{2.5}} \\ (3hs\cos\beta\cos\alpha + (2s^2 - h^2)\sin\beta) \end{cases}$$

Preferably, the partial perpendicular and partial parallel assembled permanent magnet drill collar sub, the function is:

$$\begin{cases} TRMtop = \dfrac{\mu M}{4\pi(h^2 + s^2)^{2.5}}[(2h^2 - s^2)\cos\alpha + 3hs] \\ TRMside = \dfrac{\mu M}{4\pi(h^2 + s^2)^{1.5}}\sin\alpha \\ TRMforth = \dfrac{\mu M}{4\pi(h^2 + s^2)^{2.5}}[3hs\cos\alpha + 2s^2 - h^2] \end{cases}$$

Wherein, μ is the magnetic permeability of the medium around the permanent magnet drill collar sub, M is the magnetic moment vector, α is the rotation angle of the permanent magnet drill collar sub, h is the distance from the observation point to RMforth axis, s is the corresponding position of the observation point in RMforth axis.

Preferably, during measuring the separation between one pair of horizontal wells, when one drill pipe finished, there are two measurement results, the redundant data is able to improve confidence. In addition the separation and high spacing pitch corners, the angle between the drill bit axis and the drilling well axis also have been measured.

When measuring the distance between the intersection wells and connection wells. The redundancy can be calculated by using the two tri-axial fluxgate magnetometers, and the real-time calibration can be calculated by using the certain distance between the two tri-axial fluxgate magnetometers. As a result, improve the reliability and accuracy of the data.

In summary, the rotating magnetic field range-finder of this invention includes a permanent magnet drill collar sub, downhole sensor tool, surface interface gear. The permanent magnet drill collar sub as a signal source, a downhole sensor tool as the signal receiver to detect in the downhole, the calculation method of measuring the separation and direction of the drill bit to the drilled well uses a signal from the downhole sensor tool.

In the present invention, it used for measuring separation of the drill bit to the other drill well, the permanent magnets used in the permanent magnets drill collar sub are arranged in a type of array. One type is that all permanent magnets are arranged in the way, wherein all vectors from N pole to S pole are oblique to the axis of the drill collar sub at a certain angle from the perpendicular direction. And another type is that, a part of permanent magnets are arranged in the way, wherein the vectors from N pole to S pole are perpendicular to the axis, other part of permanent magnets are arranged in the way, wherein all vectors from are parallel to the axis of the drill collar sub. Both approaches can make the rotating magnetic field more clear and more beneficial for measurement. Furthermore, in the parallel horizontal well construction, for separation 5 meters only requires 2 meters depth for displacement, or for 10 meters depth displacement is able to achieve measurement range of separation in 25 meters. And the parallel horizontal well is able to extend to 25 meters separation, wherein the depth displacement requirement of the drill can be shortened. For the intersection wells and connection wells, the largest volume of magnets installation that can make greater magnitude of magnetic field distance per meter, and can improve distance sensitive.

Downhole sensor tool of the present invention consists of two tri-axial fluxgate magnetometers to measure the rotating magnetic field in two locations. For intersection well and connection well, with the certain distance between the two tri-axial fluxgate magnetometers calculate calibration in real time can enhance the credibility and accuracy of data. For parallel wells, separation and tool-face of separation have redundant data, also is able to measure the angle which is from the drill bit axis towards the drilled well axis.

The present invention establishes a coordinate system that presents the rotating magnetic field between the drill bit axis and the fluxgate magnetometer of downhole sense tool. Wherein 6 magnetic field components at two fluxgate position, RMtop1, RMside1, RMforth1, RMtop2, RMside2, RMforth2 have been defined, and deduced function of each component between bit rotation angle, and bit depth, and relative separation of drill bit and drilled well. Building 3D images base on each magnetic field component versus drill bit rotation angle and bit depth. Reading coordinate values of the peak, valley and isoline correspond with drill bit rotation angle and bit depth and calculating with the calibration file to obtain relative drilling wells separation and direction.

In order to eliminate the effect of rotating magnets tolerance and thermal coefficient, and in order to eliminate the influence of permeability of the drill bit and permeability of the mud motor, in order to eliminate the influence of permeability of the casing in the drilled well, as the result, to ensure the confidence and accuracy of the measurements.

The present invention provides a method of calibration and a method of quality assurance to resolve calibration coefficients which is calculated the separation and separation tool-face between drill bit and drilled well through the 3D images of each magnetic field components. By using the magnetic field range finder and the measuring method of the present invention, the accumulated errors. can avoided, because the method can directly measure and achieve a precise measurement of the relative separation between the drill bit and target position. Besides, the development of the Steam Assisted Gravity Drainage (SAGD), coal-bed methane development of mineral resources, these device and method are also can be used in the fields of horizontal directional drilling for pipeline construction, freeze hole drilling in ground freezing construction, multi-well construction, and high-precision measurement of the relative separation.

Numbers in the figure refer, respectively, to:
1 permanent magnet drill collar sub; 11, permanent magnet drill collar sub body; 12, permanent magnets; 2, downhole sensor tool; 21, sensor module; 22, CPU module; 23, power module; 3, surface interface gear; 4, cable; 5, data processor.

DETAILED DESCRIPTION

Below in conjunction with the accompanying drawings and its embodiment, the present invention will be further described in detail. The specific embodiments described herein are merely for explaining the present invention, and not limiting of the present invention. It also should be noted that, for convenience of description, the accompanying drawings illustrate only some but not all of the structure associated with the present invention.

In the present invention, a rotating magnetic field is generated by a permanent magnet drill collar sub which is located in the rear of a drill bit and rotated with the drill bit. There are three components at each position of downhole sensor tool which components are generated by the rotating magnetic field. The frequency of the three components is simultaneous with that of the rotating magnetic field. The first challenge is that how to establish a calculation method to measure the rotating magnetic field strength.

Due to the size of the permanent magnet drill collar sub is much more less than the distance between the two wells, the permanent magnetic drill collar sub can be taken as a magnetic dipole.

Set up a static magnetic dipole located at the coordinate origin, the magnetic field strength H of the static magnetic dipole at any point in the space can be expressed as:

$$\begin{cases} Hx = \frac{\mu M}{8\pi r^3}(3\cos 2\varphi_0 + 1) \\ Hy = \frac{\mu M}{8\pi r^3} 3\sin 2\varphi_0 \sin\theta_0 \\ Hz = \frac{\mu M}{8\pi r^3} 3\sin 2\varphi_0 \cos\theta_0 \end{cases} \quad (1)$$

wherein, Hx, Hy, Hz stand for, respectively, the magnetic field intensity at X, Y, Z three directions, μ is the magnetic permeability of medium, where permanent magnet collars is, M is the magnetic moment vector, r is the radius vector from the origin O to the point P, $\varphi_0$ represents the angle between the radius vector and Z-axis, $\theta_0$ represents the angle between the radius vector and the X-axis in the XY plane.

Figure 2:
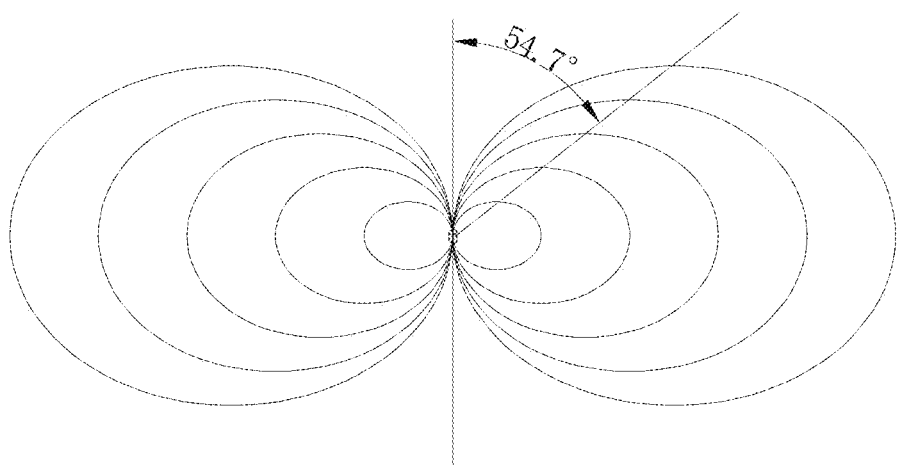
FIG. 2 shows a magnetic line model of the magnetic dipole which is elliptically polarized.
Figure 3:
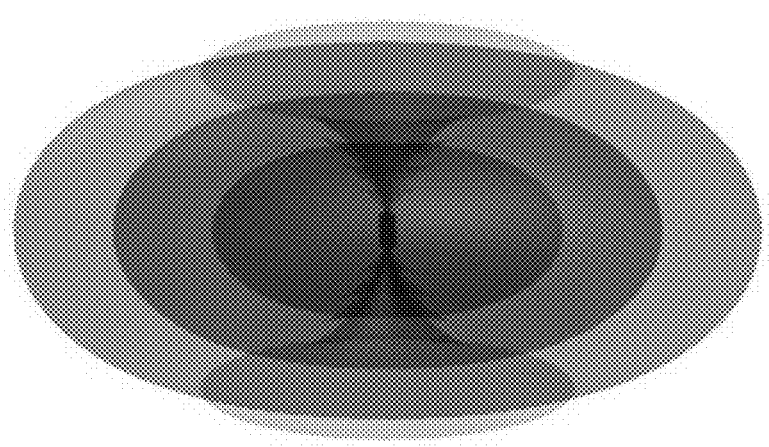
FIG. 3 shows a magnetic field model of the magnetic dipole which is elliptically polarized.

Magnetic dipole magnetic field distribution is an elliptically polarized magnetic field, according to equation (1) shows that, in the direction of the horizontal magnetic field, i.e., the direction of the magnetic field is zero Top, seen from Htop expression:

3 cos $2\varphi_0$+1=0 i.e. $\varphi_0$=54.7°, the elliptically polarized magnetic field model shown in FIG. 2 and FIG. 3.

Figure 4:
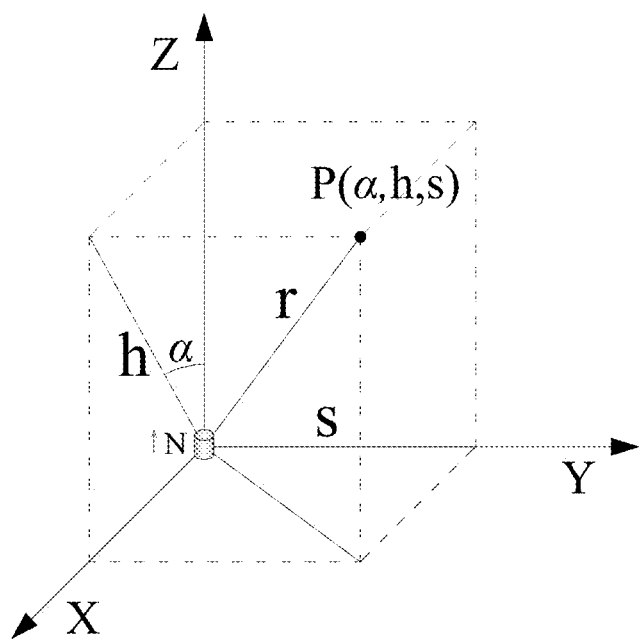
FIG. 4 shows the distribution diagram of a static magnetic dipole field strength in the space.

Then, see FIG. 4, define new variables α, h and s, the field strength H expression of static magnetic dipole at any point in the space entering is:

$$\begin{cases} H_x = \frac{\mu M}{8\pi r^5} 3h^2 \sin 2\alpha \\ H_y = \frac{\mu M}{4\pi r^5} 3hs\cos\alpha \\ H_z = \frac{\mu M}{4\pi r^5}(3 \cdot h^2 \cdot \cos^2\alpha - r^2) \end{cases} \quad (2)$$

wherein, α represents the angle between the projection of the point P in the OZX surface and Z-axis, h indicates the projection of point P in the OZX surface, s represents the projection of point P on the Y axis.

Figure 1:
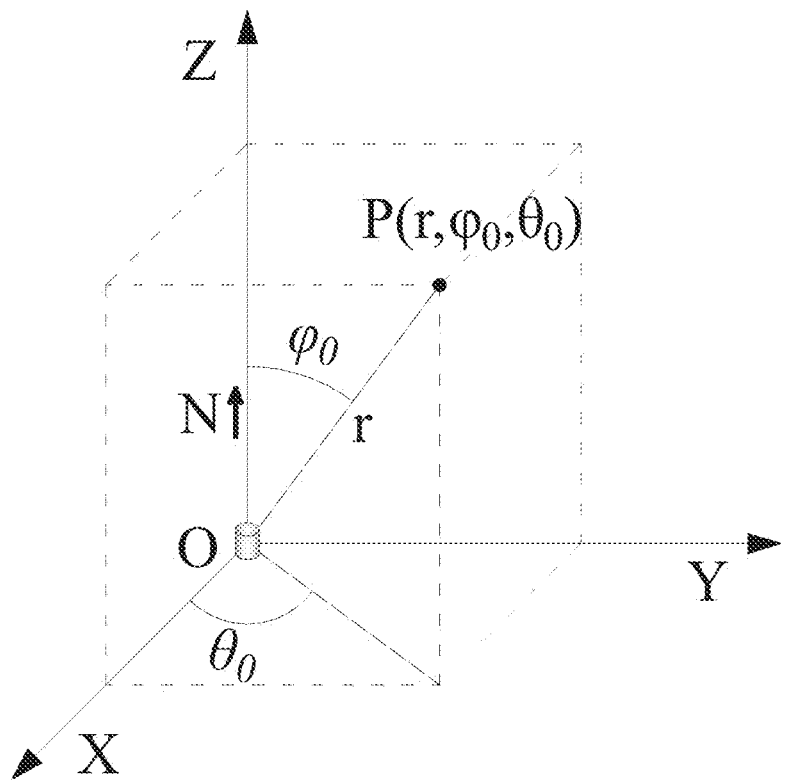
FIG. 1 shows the distribution diagram of a static magnetic dipole field strength in the space.

When the permanent magnets in the permanent magnet drill collar sub rotate, it can be seen as that elliptically polarized magnetic field at the center rotates along its horizontal radial direction, as shown in FIG. 1, it rotates in accordance with the Y-axis. Establish a RMtop, RMside, RMforth coordinate system, where RMforth is defined as rotating axis of the permanent magnet drill collar sub, RMtop direction is the direction of RMforth to the observation point, RMside direction is defined according to the right-hand rule.

In the RMtop, RMside, RMforth coordinate system, α is defined as rotation angle of the magnetic field short section, i.e., the permanent magnet drill collar sub, h is the distance from observed point to the axis RMforth, s is the corresponding position of the observation point in axis RMforth. The magnetic field component at the observation point in three directions as:

$$\begin{cases} RMtop = H_z\cos\alpha + H_x\sin\alpha \\ RMside = H_x\cos\alpha - H_z\sin\alpha \\ RMforth = H_y \end{cases} \quad (3)$$

Put it into Equation (2), obtained $$\begin{cases} RMtop = \frac{\mu M}{4\pi(h^2+s^2)^{2.5}}(2h^2 - s^2)\cos\alpha \\ RMside = \frac{\mu M}{4\pi(h^2+s^2)^{1.5}}\sin\alpha \\ RMforth = \frac{\mu M}{4\pi(h^2+s^2)^{2.5}} 3hs\cos\alpha \end{cases} \quad (4)$$

For more convenience of correct construction and highlight of relation between the rotating magnetic field eigenvalues and the spacing between the drill bit and the drilled well, the permanent magnet drill collars of the present invention are preferably adapted a specific installation mode.

Figure 5:
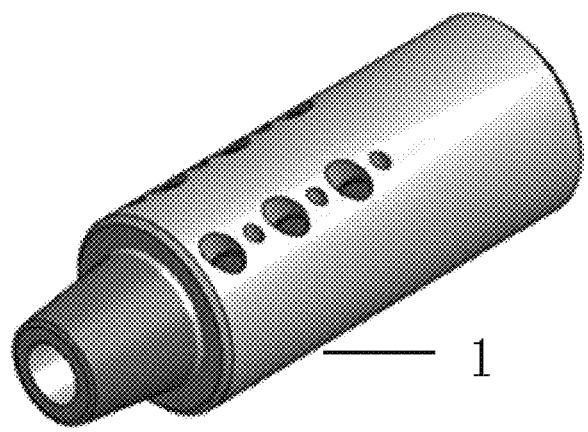
FIG. 5 shows an external view of the permanent magnet drill collar sub in a specific embodiment of the present invention.

Referring to FIG. 5, there is disclosed an external view of a permanent magnet drill collar sub 1 according to the present invention; the the permanent magnet drill collar sub 1 comprises the permanent magnet drill collar sub body 11 and permanent magnets 12, wherein the permanent magnets 12 are located inside the permanent magnet drill collar sub body 11.

Figure 6:
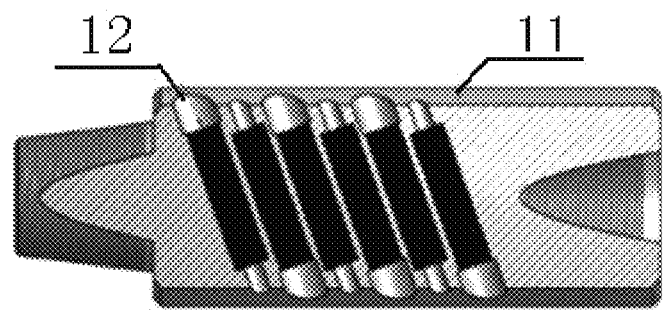
FIG. 6 shows an axial cross-sectional view of the permanent magnet drill collar sub within permanent magnet oblique assemble of a specific embodiment of the present invention.

Referring to FIG. 6, there is shown an axial cross-sectional view of a permanent magnet drill collar sub 1 obliquely assembled of embodiment of the present invention, the vertical direction of all the permanent magnets 12 are assembled relatively to the longitudinal axis of N pole to S pole with a partial angle in the oblique assembling.

Figure 7:
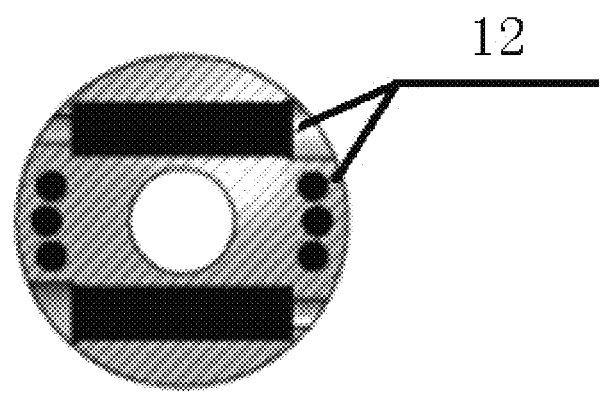
FIG. 7 shows a transverse cross-sectional view of a permanent magnet drill collar sub, wherein permanent magnets mounted perpendicular and parallel combination of a specific embodiment in the present invention.

Referring to FIG. 7, shows a transverse cross-sectional view of the permanent magnets 12 perpendicular and parallel combination of the drill collar sub of another embodiment of the invention, wherein some of the permanent magnets 12 are assembled within their N pole to S pole perpendicular to the longitudinal axis, and others of the permanent magnets 12 are assembled within their N pole to S pole parallel to the longitudinal axis.

Figure 8:
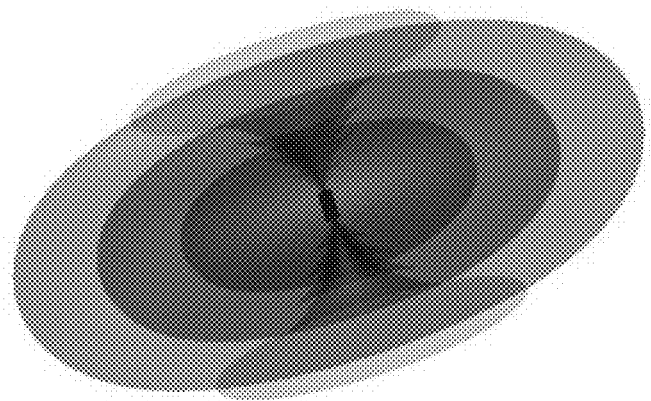
FIG. 8 shows a magnetic field model of the magnetic dipole which is elliptically polarized and tilted.
Figure 9:
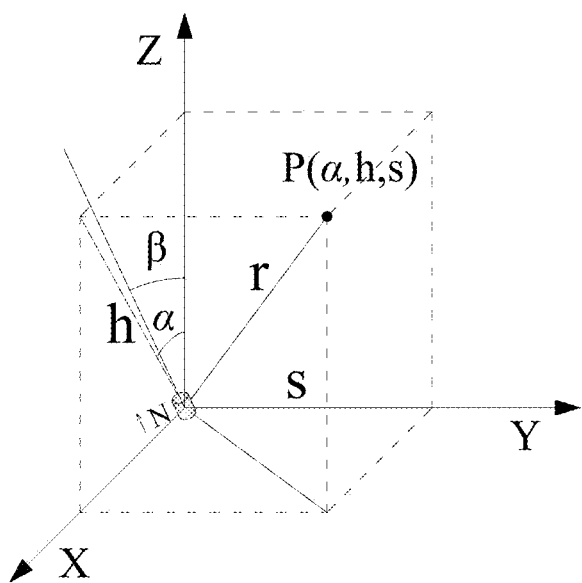
FIG. 9 shows the distribution diagram of a static magnetic dipole field strength after permanent magnets been tilted.

See FIG. 8, FIG. 9, a magnetic field model of the permanent magnets obliquely assembled within the drill collar sub is equivalent to a magnetic dipole magnetic field model of partially elliptically polarized at an angle β. When the magnetic dipole tilt angle is β, at any point in the far field space the magnetic field strength H expression is:

$$\begin{cases} H_x = \frac{\mu M}{4\pi(h^2+s^2)^{2.5}} \\ \quad 3(h^2\cos\beta\sin\alpha\cos\alpha + hs\sin\beta\sin\alpha) \\ H_y = \frac{\mu M}{4\pi(h^2+s^2)^{2.5}} \\ \quad (3hs\cos\beta\cos\alpha + (2s^2 - h^2)\sin\beta) \\ H_z = \frac{\mu M}{4\pi(h^2+s^2)^{2.5}} \\ \quad (3h^2\cos\beta\cos^2\alpha + 3hs\sin\beta\cos\alpha - r^2\cos\beta) \end{cases} \quad (5)$$

When the drill collar including inclined permanent magnets rotates along the axis, as shown in FIG. 1, it rotates around the Y axis. Establish RMtop, RMside, RMforth coordinate system, and rotation axis is defined as RMforth, RMtop is the direction of RMforth axis to the observation point, and RMside direction is determined according to the right-hand rule.

The RMtop, RMside, RMforth coordinate system is defined as the rotation angle α short section of the rotating magnetic field, h is the distance between the point observed RMforth shaft, s corresponding to the position of the observation point in RMforth axis. Component of the magnetic field at the observation point in three directions as follows:

$$\begin{cases} JRMtop = H_z\cos\alpha + H_x\sin\alpha \\ JRMside = H_x\cos\alpha - H_z\sin\alpha \\ JRMforth = HY \end{cases} \quad (6)$$

Putting into Equation (5), to obtain:

$$\begin{cases} JRMtop = \dfrac{\mu M}{4\pi(h^2+s^2)^{2.5}} \\ \quad ((2s^2-h^2)\cos\beta\cos\alpha + 3hs\sin\beta) \\ JRMside = \dfrac{\mu M}{4\pi(h^2+s^2)^{2.5}}\cos\beta\sin\alpha \\ JRMforth = \dfrac{\mu M}{4\pi(h^2+s^2)^{2.5}} \\ \quad (3hs\cos\beta\cos\alpha + (2s^2-h^2)\sin\beta) \end{cases} \quad (7)$$

wherein, JRMforth represents the magnetic field strength along the rotation axis direction, i.e. RMforth, JRMtop represents the magnetic field strength of RMforth axis, i.e., of direction of the rotation axis to the observation point, JRMside is the magnetic field strength of direction RMside, which is determined according to the right-hand rule.

When the permanent magnet mounted axially, equivalently elliptical polarization magnetic field model of magnetic dipole drift off 90 degrees, the angle β in equation (7) is 90 degrees. Then:

$$\begin{cases} HRMtop = \dfrac{\mu M}{4\pi(h^2+s^2)^{2.5}}3hs \\ HRMside = 0 \\ HRMforth = \dfrac{\mu M}{4\pi(h^2+s^2)^{2.5}}(2s^2-h^2) \end{cases} \quad (8)$$

Rotating magnetic field mode of perpendicular and parallel mounted combination of permanent magnet drill collar is:

$$\begin{cases} TRMtop = RMtop + HRMtop \\ TRMside = RMside + HRMside \\ TRMforth = RMforth + HRMforth \end{cases} \quad (9)$$

Putting into Equations (4) and (9), obtain:

$$\begin{cases} TRMtop = \dfrac{\mu M}{4\pi(h^2+s^2)^{2.5}}[(2h^2-s^2)\cos\alpha + 3hs] \\ TRMside = \dfrac{\mu M}{4\pi(h^2+s^2)^{2.5}}\sin\alpha \\ TRMforth = \dfrac{\mu M}{4\pi(h^2+s^2)^{2.5}}[3hs\cos\alpha + 2s^2-h^2] \end{cases} \quad (10)$$

Construction of 3D images of magnetic field component and bit rotation angle and bit depth, apparently the correlation of eigenvalues of the image and spacing of drill bit and drilled well is more distinctive. According to the butt or parallel or around the barrier of use, to obtain the most distinct correlation, you can choose a different arrangement of permanent magnet collars.

Wherein, TRMforth represents RMforth, i.e. the magnetic field strength of the rotation axis direction, TRMtop represents the magnetic field strength of RMforth axis i.e., of direction of the rotation axis to the observation point, TRMside represents the magnetic field strength of RMside axis, which is determined according to right-hand rule.

Construction of a 3D image of magnetic field component and bit rotation angle and bit depth, the correlation between eigenvalues of the image and relative distance between the drill bit and drilled well more distinctive. According to the butt or parallel or around the barrier of use, to obtain the most distinct correlation, you can choose a different arrangement of permanent magnet collars.

According to the said theoretical analysis, the rotating magnetic field rangefinder of the present invention includes a permanent magnet drill collar sub 1, downhole detectors 2 and ground interface box (or surface interface gear) 3. Wherein the permanent magnet drill collar sub 1 comprises a permanent magnet collar body 11, and a plurality of permanent magnets 12 fixed in the interior of the drill collar body 11, the said permanent magnet drill collar sub 1 is fixed to the rear part of drill bit, and it becomes short section, and rotates together with the drill bit to generate rotating magnetic field, and to provide a magnetic field source; between two tri-fluxgate magnetometers is fixed, they are used for measuring the fields of rotating magnetic field at two locations, the fluxgate magnetometers are used for establishing a fluxgate coordinate system in the Earth's gravitational field and the Earth's magnetic field. The said ground interface box 3 was used for data processing, and for supplying the downhole detectors. The said downhole detectors 2 and the ground interfaces box 3 are connected with the data and power cable 4.

Wherein said ground interface box 3 can also use many ways, for example, with USB cable 6 to connect various data processing apparatus 5, such as a PC.

Preferably, the permanent magnet drill collar sub 1 comprises either a drill collar mounted permanent magnet oblique drill collar, or a combination of vertical and parallel permanent magnet mounted collars.

In the oblique mounted permanent magnet drill collar, the vertical direction of all the permanent magnets 12 are arranged with NS pole relative to the longitudinal axis of with a certain angle inclined installation.

In the perpendicular and parallel combination permanent magnet drill collar, some of the permanent magnets 12 are arranged with the NS pole perpendicular to the longitudinal axis, and others of the permanent magnets 12 and aligned with the NS pole parallel the longitudinal axis.

Both permanent magnet collars can be made in the specific construction more convenient, and makes the correlation between characteristics of the rotating magnetic field and relative distance between the drill bit and drilled well more distinctive.

Figure 10:
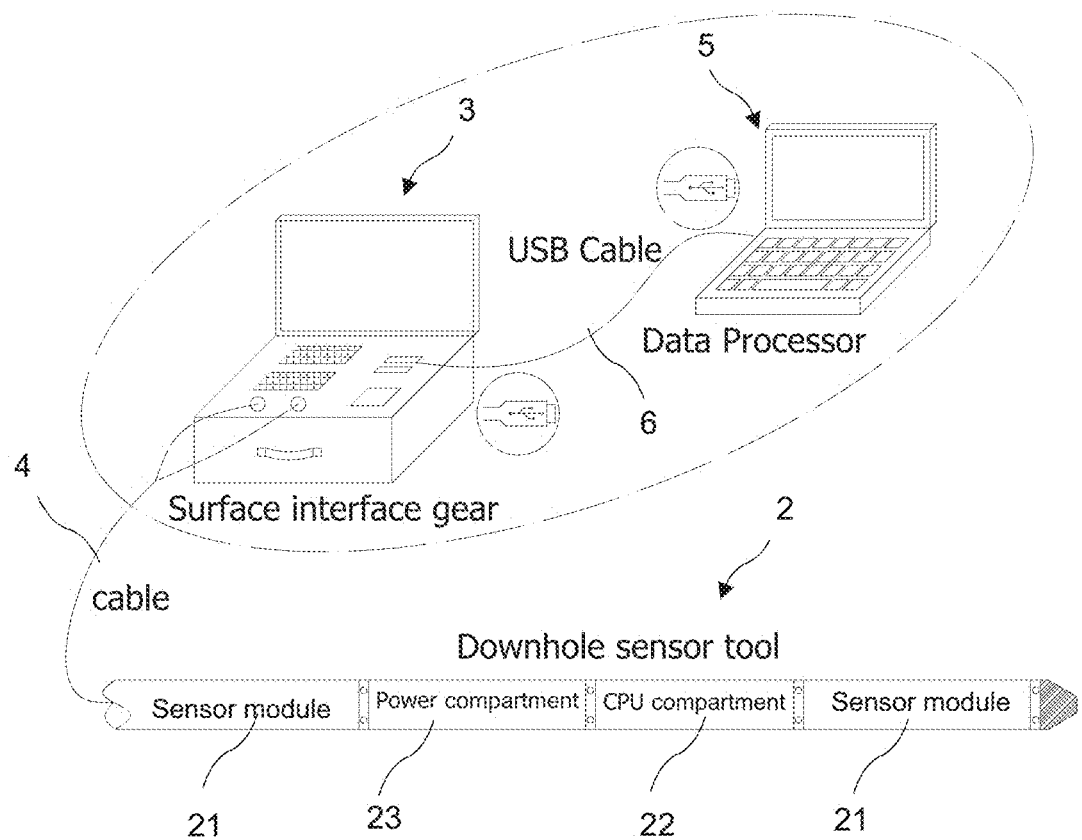
FIG. 10 shows a schematic view of the surface interface gear and downhole sensor tool, in accordance with an embodiment of the present invention.

Preferably, referring to FIG. 10, the said downhole detector 2 comprises two sensor cabins 21, a CPU module 22 and a power supply module 23, cabin 21 in which the two sensors separated by a certain distance, for example, may cause the CPU 22 and the power supply module 23 located between two sensor cabins 21. Each sensor cabin 21 is composed of three mutually perpendicular gravity accelerometer and a high-precision tri-axial fluxgate sensors, role of three accelerometers is to determine the inclination and gravity high side of downhole detectors to establish fluxgate coordinate system, Tri-axial fluxgate sensors measure three components of the rotating magnetic field at the center of the tri-axial fluxgate sensors along with the three axes, the three components of the magnetic field at two positions of two sensors cabin, six sine wave signal obtained. The distance between two tri-axial fluxgate sensors is known, can be used for real-time calibrating the rotating magnetic field, and verifying the obtained data, which is not only redundant but also real-time calibration; power supply module 23 take power from the cable 4, also transmit data with cable; CPU module 22 collect voltages from sensor cabin, the voltage data of two sensors cabins and transferred data in a form such as Manchester encoding to the power supply module 23.

Preferably, the said cable 4 is a single core wire cable, to increase the strength of the cable.

The present invention also discloses a method of the above-described magnetic field drilling rangefinder for relative distance measurement, comprising a rotating magnetic field short section, which is mounted on the drill bit, and rotates with the drill bit together for generating a magnetic field, the downhole detector 2 is placed in another well, a rotating magnetic field at each position on the downhole detector at the target position, resulting in three orthogonal components, their frequency synchronization with the rotating magnetic field.

The method includes constructing 3D images of RMtop1, RMside1, RMforth1, RMtop2, RMside2, RMforth2 six field component and drill angle and depth with using the time waveform measurements and depth time waveform obtained with fluxgate, building 3D images of the sum of the squares (hereafter "square sum") of each component of the magnetic field at fluxgate, or square sum of two components of the magnetic field at each position, or other operation results of some components of six magnetic fields and bit rotation angle and the drill bit depth at each position, or other operation results of some components of six magnetic fields and drill bit rotation angle and the bit depth at each position, reading these waveforms peaks, valleys and the isogram related drill bit rotation angle and bit depth values, deduced function of bit rotation angle and bit depth of the drill bit and drilling separation and respective magnetic field components at each flux gate position between, and after calculating relationship of each components to obtain relative distance and direction of the drill bit with respect to drilled downhole. This eliminates the errors caused by interference of the magnetic field to obtain a reliable highly and accurate results.

The magnetic material interference of drill bit, screw, and the target well, results in deformation of the magnetic field distribution, and affects the measurement results. Therefore, the calibration file refers to the correlation coefficient calibration files in accordance with the conditions, and with the magnetic field distribution of the deformed 3D images to fit the characteristics, the required spacing, and direction.

Wherein, for the installation of a permanent magnet oblique drill collar, the function refers to the formula (7), for the permanent magnet perpendicular to the parallel combination of the drill collar installed, the function refers to the formula (10).

Figure 11:
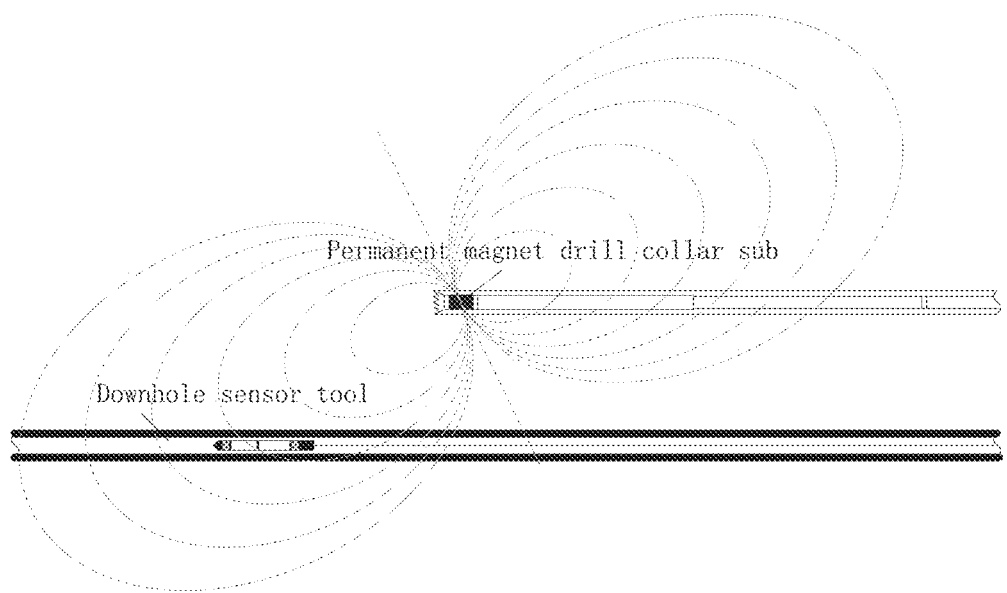
FIG. 11 shows a schematic view of ranging for twinning horizontal wells, in accordance with an embodiment of the present invention.

Embodiment 1, Rotating Magnetic Field Rangefinder Applied in Horizontal Paired Wells for Steam Assisted Gravity Drainage SAGD Referring to FIG. 11, SAGD is a pair of horizontal wells. The upper horizontal well is the injector which injects the hot steam to the heavy oil, and lower well is the production well which drain the heavy oil. During the drilling, the downhole sensor tool is placed in the drilled well and ahead of the drill bit by a half casing length by the single core steel armored cable. Date samples start before a drill pipe begins to drill and stop after the drill pipe finished. Meanwhile the bit depth with time data will be recorded.

Figure 12:
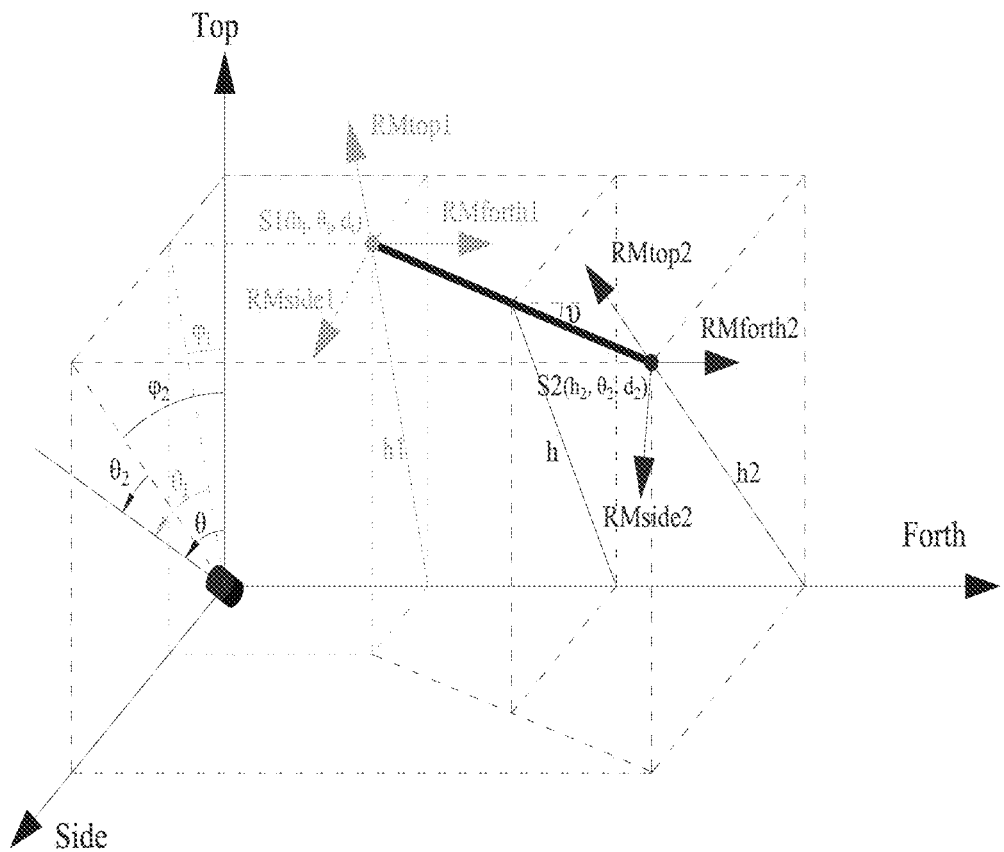
FIG. 12 shows the distribution diagram of field strength in ranging for twinning horizontal wells, in accordance with an embodiment of the present invention.

While drilling of SAGD horizontal twin wells, the inclination of the two wells can be controlled easily, but the yaw angle between the two wells is hard to determine. The relative relationship between the rotating magnetic field and downhole sensor tool are shown in FIG. 12.

The coordinate system of Top, Side, Forth, the Top axis vertically upward, the Forth axis is the axis of downhole sensor tool, and the Side axis is determined in accordance with the right hand rule. The RMforth axis is the rotation axis for permanent magnet drill collar sub, the RMtop axis is vector pointing from RMforth to the position where the fluxgate magnetometer is, the RMside axis is determined in accordance with the right hand rule. The distances between the permanent magnet drill collar sub 1 and the two fluxgate magnetometers are s1 and s2. The distances between two fluxgate magnetometers and the RMforth axis are h1 and h2, Distances between pedals (or intersection point of a vertical cross) of positions of two fluxgate magnetometers at RMforth axis and the permanent magnet drill collar sub are d1 and d2. The rotation angle of the permanent magnet drill collar sub is with reference to the fluxgate magnetometer locations, rotation angles are $\theta 1$ and $\theta 2$. Between the rotation axis of the permanent magnet drill collar sub and the axis of downhole sensor tool, there is a yaw angle v.

Figure 13:
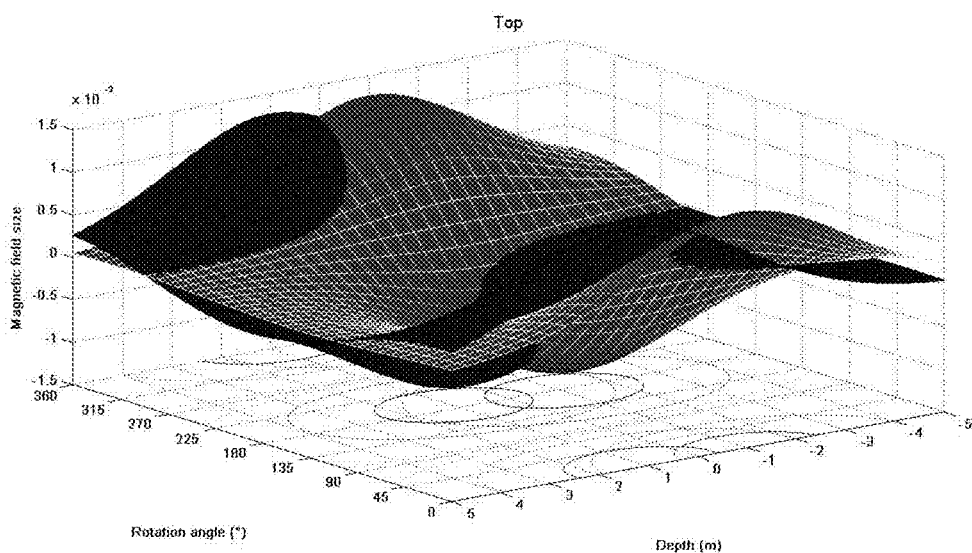
FIG. 13 shows the 3D image of two RMtops in ranging for twinning horizontal wells, in accordance with an embodiment of the present invention.
Figure 14:
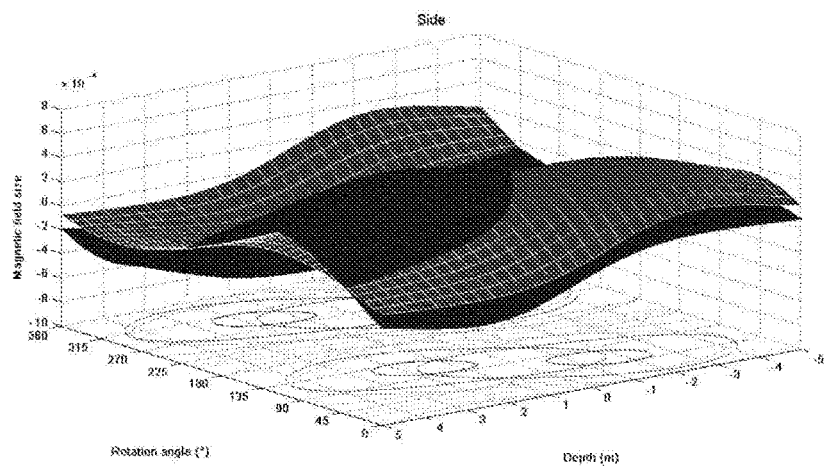
FIG. 14 shows the 3D image of two RMsides in ranging for twinning horizontal wells, in accordance with an embodiment of the present invention.
Figure 15:
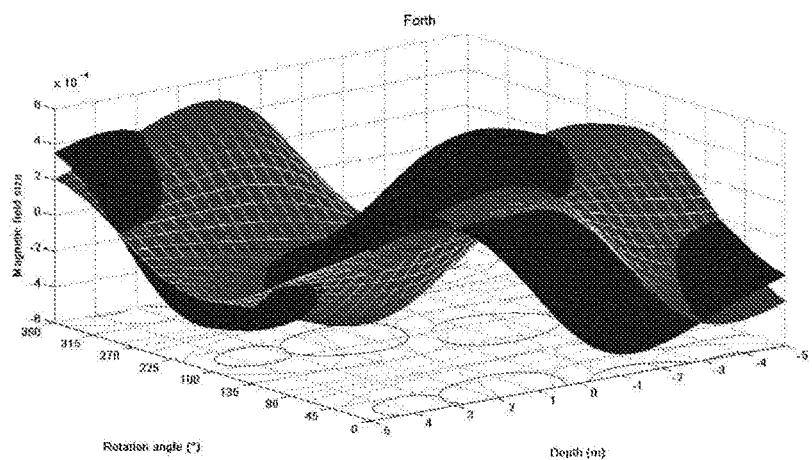
FIG. 15 shows the 3D image of two RMforths of in ranging for twinning horizontal wells, in accordance with an embodiment of the present invention.

Two fluxgate magnetometers which located at the downhole sensor tool measure rotating magnetic field, and the frequency of six magnetic field components at two positions of the fluxgate magnetometers is synchronized with the rotating magnetic field, the amplitude and phase vary with depth of drilling. A drill pipe is usually about 10 m, in SAGD horizontal wells pairs drilling, the vertical separation of the horizontal section of wells 5.0 m±0.5 m, horizontal separation of 0.0 m±0.5 m. After finishing one drill pipe, magnetic field at the sensors position of the downhole sensor tool is shown in FIG. 11. In the coordinate system of top, side, forth, h0 is 5 m, d0 is in the range of −5 m to +5 m range, rotation angle is in the range of 0 to 360 degrees, under these conditions, obtained 3D images are shown in FIG. 13-15.

The sampled data of two tri-axial fluxgate magnetometers and tri-axial accelerometer is filtered to calculate the three components of the downhole sensor tool, and to build a downhole sensor tool coordinates system of the Earth's gravity, without magnetic field coordinate system. The sampled data for two three-axis fluxgate magnetometers is filtered to give a rotating magnetic field data, and coordinate rotation is carried out to obtain six rotating magnetic field components. The coordinate systems of two fluxgate magnetometers is Top, Side, Forth. For each magnetometers are RMtop1, RMside1, RMforth1, RMtop2, RMside2, RMforth2. Use the three-axis components magnetic field at two sensors position to calculate current drill bit angle, θ1 and θ2. According to data from the well depth records, calculate current well depth. The method further includes building a 3D image base on each magnetic field component versus rotating magnetic field angle and well depth, building a 3D image of square sum, or square sum of two components, or six components magnetic field versus bit rotation angle and bit depth. Reading coordinate values of the peak, valley and isoline correspond with drill bit rotation angle and bit depth, And deducting the function relationship of each magnetic field components versus bit rotation angle and bit depth and also separation of drill bit from drilled well, calculating with the calibration file to obtain the separations h1 and h2, and direction ψ1 and ψ2 of drill bit with respect to drilled wells and yaw angle, also it can be determined with image recognition and curve fitting according to the 3D waveform data library which is produced in calibration.

In drilling of SAGD horizontal well pairs, the permanent magnet drill collar sub with the all permanent magnets in oblique way can cooperate with the downhole sensor tool. For separation of two wells at 5 meters, accurate results can be calculated when only two meters displacement of depth. Or for 10 meters of depth displacement separation, the measurement range of 25 meters can be achieved. which means drilling of 25 meters separation parallel wells can be achieved.

Therefore, in parallel wells, after a drill pipe finished, there are two measurements results, the redundant data can be used for improving confidence. Not only the measurement of separation and separation high-side angle, but also the angle between drill bit axis and drilled well axis can be measured.

Embodiment 2, Application of the Rotating Magnetic Field Rangefinder in Intersection of Horizontal Well to Vertical Well.

In intersection drilling of the horizontal well to vertical well, the permanent magnet drill collar sub is located at the rear part of the drill bit, downhole sensor tool (2) connected with a cable and been placed in vertical well at a target position while on the ground floor there are a surface interface gear (3) and a computer (5). The cable (4) is been used for power supply and transmit data from the downhole sensor tool (2) to the surface interface gear (3). Date samples start before a drill pipe begin to drill and stop after the drill pipe finished. Meanwhile the bit depth with time data are recorded. Drilling engineers obtain the offset radius and the offset high-side of the target position by analyzing the data.

Figure 16:
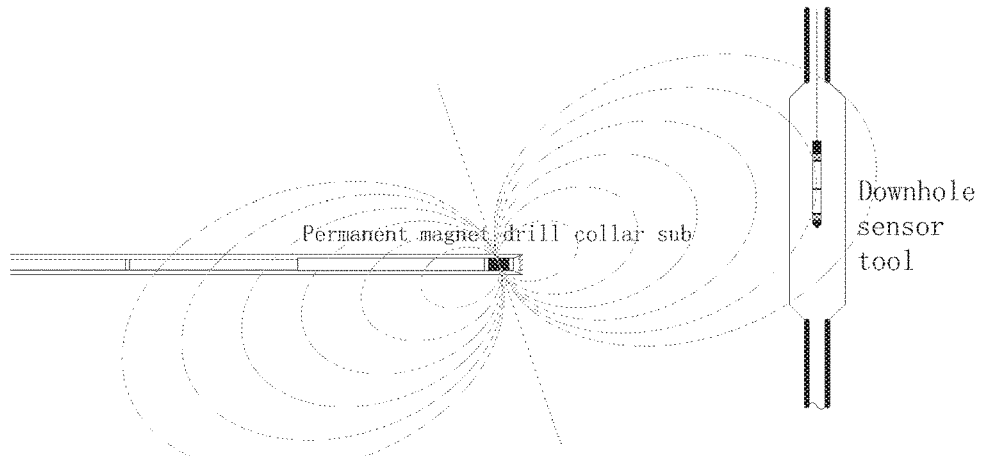
FIG. 16 shows a schematic view of ranging for intersection of a horizontal well to a vertical well, in accordance with an embodiment of the present invention.
Figure 17:
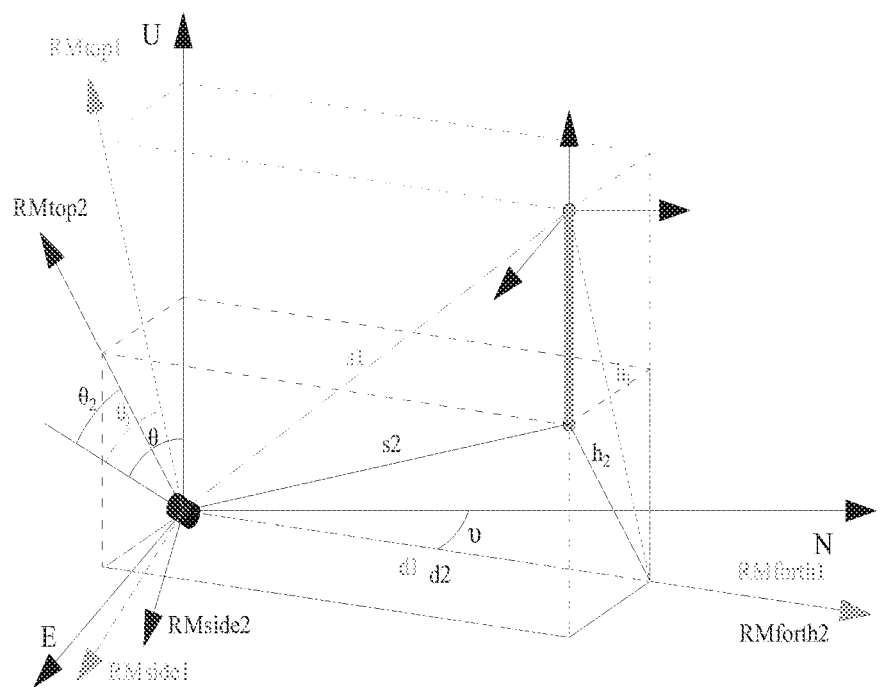
FIG. 17 shows the distribution diagram of field strength in ranging for intersection of a horizontal well to a vertical well, in accordance with an embodiment of the present invention.
Figure 18:
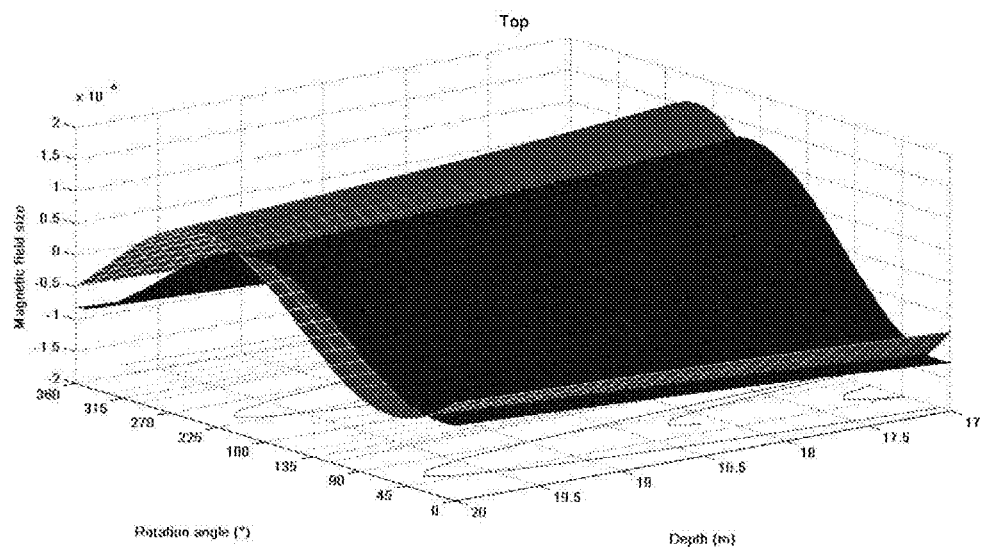
FIG. 18-21 shows the 3D images of two RMtops, RMsides, RMforths, and also RMtotals in ranging for intersection of a horizontal well to a vertical well, in accordance with an embodiment of the present invention.
Figure 19:
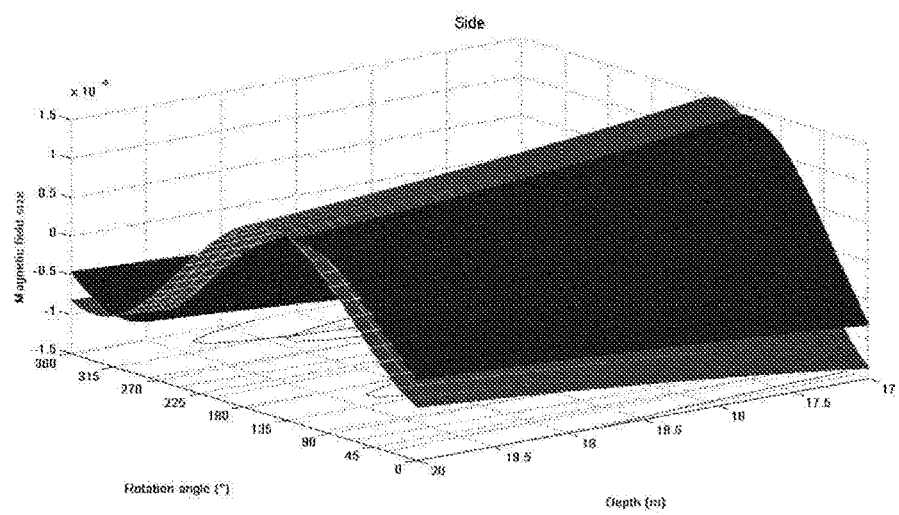
Figure 20:
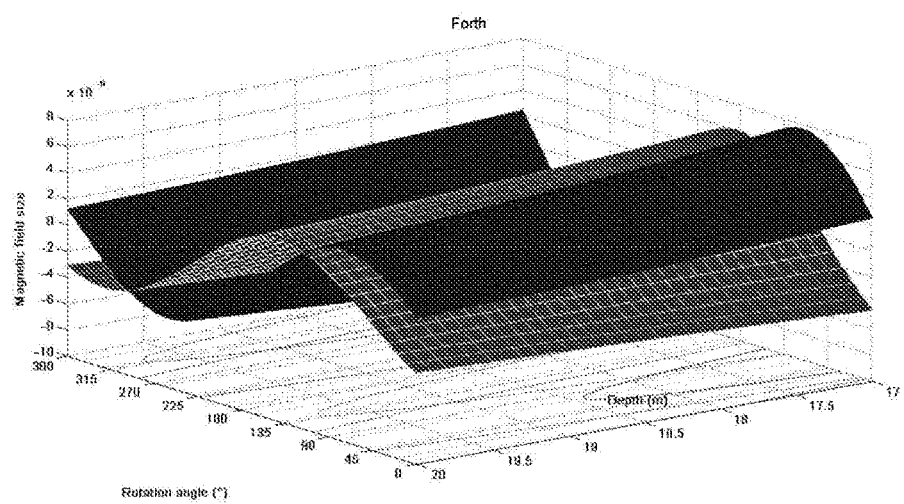
Figure 21:
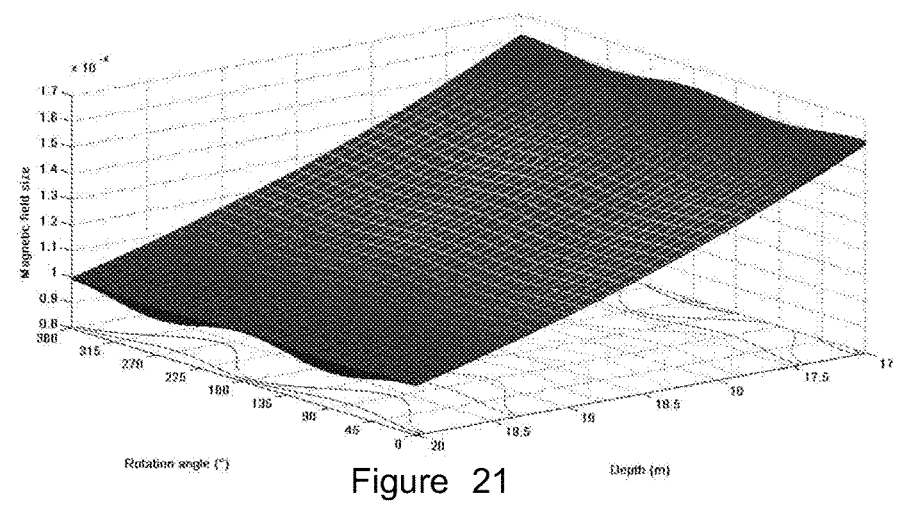

In intersection drilling of horizontal well to vertical well, the relationship between the rotating magnetic field and the downhole sensor tool is illustrated in FIGS. 16 and 17.

Referring to FIG. 17, in the coordinate system of U, E, N: the U axis vertically upward, the E axial eastward, and the N-axis points to the North. RMforth axis is for the rotation axis of the permanent magnet drill collar sub, RMtop axis is the vector of RMforth axis pointing the fluxgate magnetometer position, and RMside axis is determined by the right hand rule. The distances between two fluxgate magnetometers and the permanent magnet drill collar sub are s1 and s2, the distances between two fluxgate magnetometers and the RMforth axis are h1 and h2, the distances between pedals of positions of two fluxgate magnetometers at RMforth axis and the permanent magnet drill collar sub are d1 and d2, downhole sensor tool is been placed vertically, so d1 and d2 are same.

The rotation angle of the permanent magnet drill collar sub is with the reference of fluxgate magnetometer locations, rotation angles are θ1 and θ2. Between the rotation axis of the permanent magnet drill collar sub and the axis of downhole sensor tool, there is a yaw angle v.

In the coordinate system of U, E, N, there is a 3D model by the simulation according to the equation (2). The permanent magnet drill collar sub moves forwards with bit every 3 meters, the data sampling is described below.

The sampled data of two tri-axial fluxgate magnetometers and tri-axial accelerometer is filtered to build a downhole sensor tool coordinates system of the Earth's gravity and Earth's magnetic field. The sampled data for two three-axis fluxgate magnetometers is filtered to give a rotating magnetic field data, and coordinate rotation is carried out to obtain three rotating magnetic field components. The coordinate systems of two fluxgate magnetometers is U,E,N. According to the rotation angle at each time, the three axis components of the magnetic field at the sensors is calculated; recording depth data at each time; based on the sensor data, the three components of the magnetic field obtained at each time, a total of six two positions components. The method further includes building a 3D image base on each magnetic field component versus rotating magnetic field angle and well depth, and building a 3D image of square sum, or square sum of two components, or six components magnetic field versus bit rotation angle and bit depth. Reading these waveforms peaks, valleys and the isogram related bit rotation angle and bit depth values, deduced function of bit rotation angle and bit depth of the drill bit and drilling separation and respective magnetic field components at each flux gate position between, and after calculating relationship of each components to obtain relative distance and direction of the drill bit with respect to drilled downhole. Comparing with 3D calibration waveform library, it is able to determine the distance of the drill bit from drilled well s1 and s2, offset h1, h2 and left-right offsets. By using two tri-axial fluxgate magnetometers, there are redundant results s1, s2, h1, h2, and left-right offsets, comparing them with the known distance between two tri-axial fluxgate magnetometers, it is able to correct calculated results and improve the reliability and accuracy of data.

Embodiment 3, Application of Rotating Magnetic Field Rangefinder in Horizontal Connection Wells.

Figure 22:
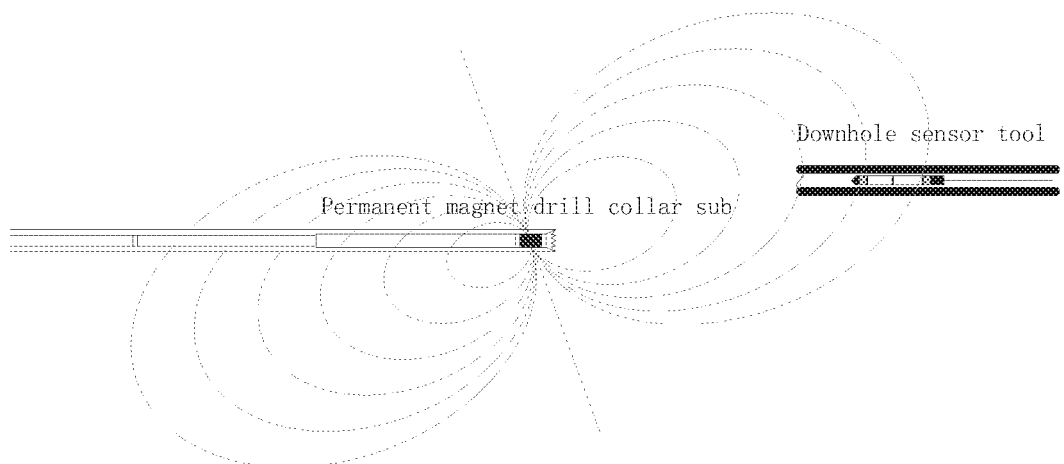
FIG. 22 shows a schematic view of ranging for connection of two horizontal wells, in accordance with an embodiment of the present invention.

In drilling of horizontal connection wells, the relation of the rotating magnetic field and downhole sensor tool is illustrated in FIG. 22.

Figure 23:
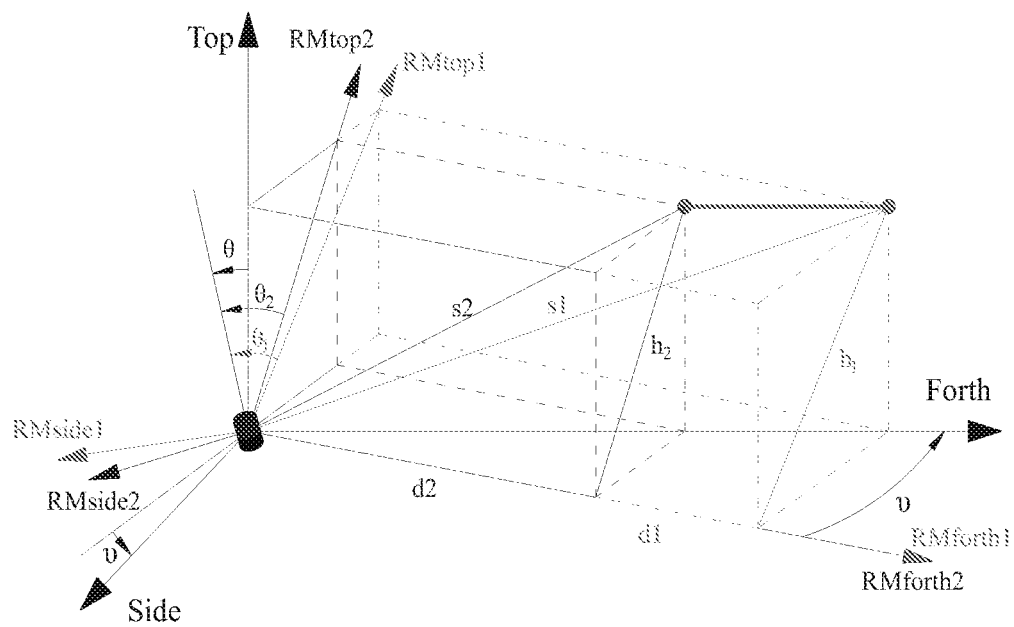
FIG. 23 shows the distribution diagram of field strength in ranging for connection of two horizontal wells, in accordance with an embodiment of the present invention.

Referring to FIG. 23, in the coordinates system of Top, Side, and Forth, there is a 3D model (or image) by the simulation according to the equation (7), in this the specific 3D images is no longer shown.

The sampled data of two tri-axial fluxgate magnetometers and tri-axial accelerometer is filtered and to build a downhole sensor tool coordinates system of the Earth's gravity and Earth's magnetic field. The sampled data from the two three-axis fluxgate magnetometers is filtered to obtain rotating magnetic field data, and coordinate rotation is carried out to obtain three rotating magnetic field components for each sensor. The coordinate systems of the two fluxgate magnetometers is U,E,N. According to the rotation angle at each time of three axis component of the magnetic field at the sensors is calculated; recording depth data at each time. Based on the sensor data, the three components of the magnetic field is obtained at each time, a total of six two position components. A 3D waveform of each magnetic field component versus a rotating magnetic field angle and depth is determined, and 3D images of other operations of the six components versus the bit rotation angle and bit depth are determined. Read the special value of the waveform, deduced function of bit rotation angle and bit depth of the drill bit and drilling separation and respective magnetic field components at each flux gate position between, and after calculating relationship of each component, after calculating relationship of each components to obtain the positive drilling distance to the target, the offset radius, the high-side offset.

Comparing the positive the drilling distance to the target, the offset radius, the high-side offset with the known distance between two tri-axial fluxgate magnetometers, it is able to correct calculated results and improve the reliability and accuracy of data.

Embodiment 4, Drilling of Dense Vertical Multi-Wells.

Figure 24:
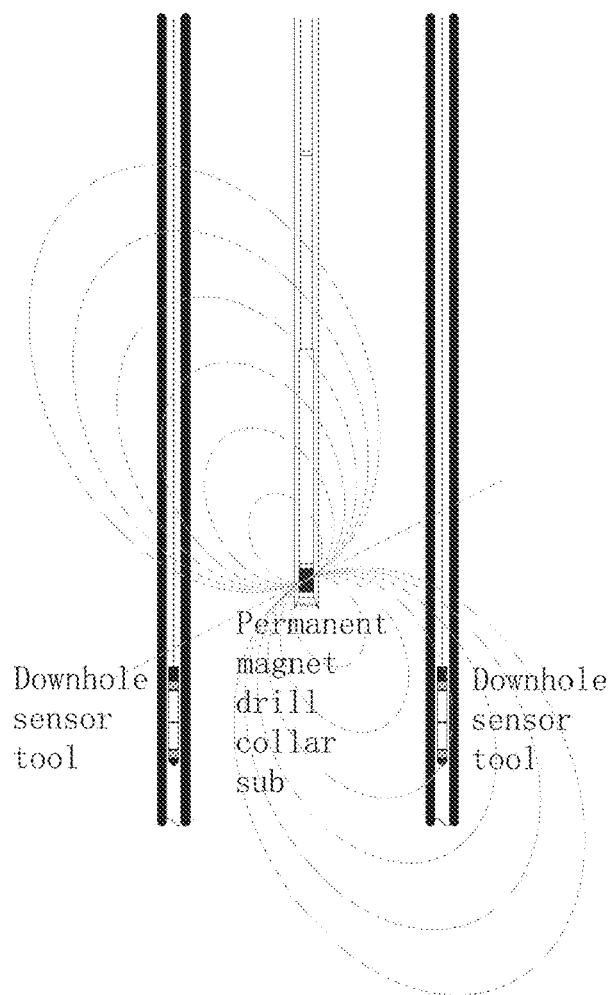
FIG. 24 shows a schematic view of ranging for construction of multi-vertical-wells, in accordance with an embodiment of the present invention.
Figure 25:
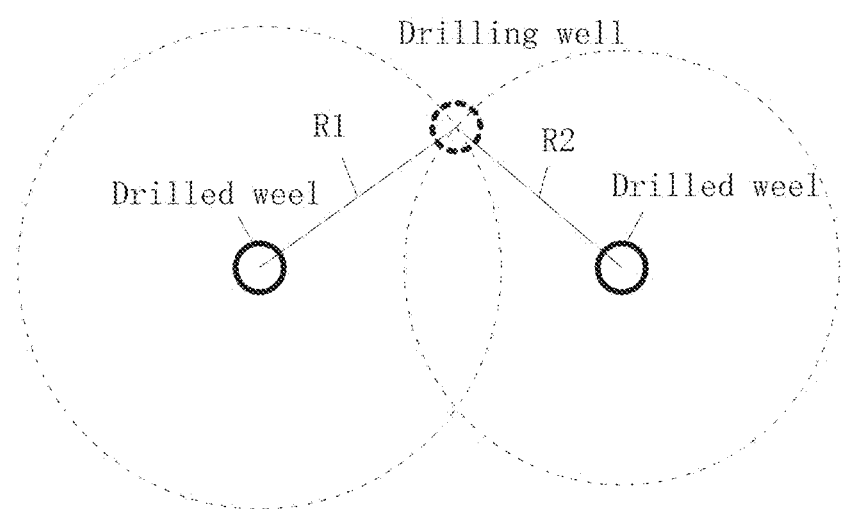
FIG. 25 shows a schematic view of separation for multi-vertical-wells, in accordance with an embodiment of the present invention.

See FIGS. 24 and 25, When the tool face of downhole sensor tool cannot be determined, it requires that two downhole sensor tools placed in drilled wells. Then there are R1 and R2 (two separations between drilling well to two drilled wells) are obtained. Furthermore, R1 and R2 are used for determining the position of drilling well.

The three components of magnetic field strength is calculated at each time for locations of the two sensor by using the data of two tri-axial fluxgate magnetometers. According to depth record data, depth positions obtain at each time,data processing is carried out in time series, building a 3D waveform of the magnetic field components versus the rotating magnetic field angle and down hole depth.

Using the 3D image base on each magnetic field component of four sensors of the two downhole sensor tools versus rotating magnetic field angle and well depth, and by comparing with of 3D calibration waveform library, the relative separation of drill bit to each drilled wells can be determined, the angle between drill bit axis and the axis of each drilled wells also can be determined.

In summary, the magnetic field range finder and a measuring method of the present invention, can directly measure the relative positions of the drill bit and the target position, avoiding the accumulation of errors, to achieve a precise measurement of the relative position of the drill and targets. Besides, the development of the SAGD, coal-bed methane, development of other mineral resources, the rotating magnetic field rangefinder and its method can be used in the fields of horizontal directional drilling for pipeline construction, freeze hole drilling in ground freezing construction, multi-well drilling, and high-precision measurement of the relative separation.

The above content in connection with the specific preferred embodiments of the present invention is described in more detail made, may determine that the specific embodiments of the present invention be limited thereto, the present invention pertains to the technical field of ordinary skill, in departing from the inventive concept can premise next, you can also make a number of simple deduction or replacement should be considered as part of the present invention is defined by the claims submitted by the right to determine the scope of protection.

We claim:

1. A rotating magnetic field rangefinder for measuring relative separation between a drill bit and a well, comprising: the drill bit; a magnetic drill collar sub assembly is located in the rear of drill bit, the magnetic drill collar sub assembly rotates together with drill bit providing a rotating magnetic field signal source to generate a rotating magnetic field; a down hole sensor tool configured to reside in a position in an existing well, the downhole sensor tool including: two tri-axial fluxgate magnetometers spaced apart to measure the rotating magnetic field in two locations, the two tri-axial fluxgate magnetometers configured to measure each component of the rotating magneticfield at the position of the downhole sensor tool; and three accelerometers, the three accelerometers and two tri-axial fluxgate magnetometers cooperating to establish a coordinate system for the two tri-axial fluxgate magnetometers in the Earth's gravity field and the Earth's magnetic field; surface interface gear in electrical communication with the downhole sensor tool, the surface interface gear receiving data from the downhole sensor tool, wherein: the magnetic drill collar sub assembly is a permanent magnet drill collar sub assembly including permanent magnets creating the rotating magnetic field; the permanent magnet drill collar sub assembly defines a sub assembly axis aligned with the length of the permanent magnet drill collar sub assembly; and the permanent magnets comprise both perpendicularly aligned permanent magnets and parallel aligned permanent magnets residing within permanent magnet drill collar sub assembly.

2. The rotating magnetic field range finder of claim 1, wherein the surface interface gear is electrically connected to the down hole sensor tool by a cable and receives the data through the cable and provides electrical power to the down hole sensor tool through the cable.

3. The rotating magnetic field range finder of claim 2, wherein said cable is a single core steel armored cable.

4. The rotating magnetic field range finder of claim 1, wherein: the permanent magnet drill collar sub assembly defines a sub assembly axis aligned with the length of the permanent magnet drill collar sub assembly; the permanent magnets are obliquely assembled within permanent magnet drill collar sub assembly; and permanent magnets are arranged in a vector from N pole to S pole at an angle to the sub assembly axis.

5. The rotating magnetic field range finder of claim 1, wherein: the downhole sensor tool includes two sensor modules, a CPU module, and a power module; the two sensor modules are spaced apart and each sensor module includes three of the accelerometers residing perpendicular to each other, and one of the two tri-axial fluxgate magnetometers; the three accelerometers determine inclination and gravity high side tool-face which establishes a coordinate system for the two tri-axial fluxgate magnetometers; the at least one tri-axial fluxgate magnetometers are used for measuring the rotating magnetic field components in the coordinate system at the center of the fluxgate magnetometers; the power module obtains electrical power by a cable, and also transmits data by the cable; and the CPU module samples sensor voltage and transmits the sampled voltage data of the two sensors module to the power supply module.

6. The rotating magnetic field range finder of claim 5, wherein: using the time waveforms produced by the tri-axial fluxgate magnetometers and time waveform of depth, the rotating magnetic field range finder is configured to create 3D images which present RMtop1, RMside1, RMforward1, RMtop2, RMside2, and RMforward2, six magnetic field components versus a bit rotation angle and bit depth; the 3D images present a sum of the squares of three magnetic field components at each position, or sum of the squares of two magnetic field components at each position; separation and direction between the bit and drilled well are determined by reading coordinate values of the peak, valley and isoline correspond with drill bit rotation angle and bit depth, based on: functions of separation and direction between the drill bit and drilled well to the drill bit rotation angle and the bit depth; on magnetic field components at positions of each fluxgate; and on each component calculated by calibration files; wherein RMforward is the rotation axis direction of the permanent magnet drill collar sub assembly, RMtop is the direction from the RMforward axis to the observation point, and RMside direction is according to the right-hand rule.

7. The rotating magnetic field range finder of claim 6, wherein the calibration file refers to the correlation coefficient file for calibrating with distorted magnetic field, then the calibration file and the 3D image characteristics are working together to determine separation and direction.

8. The rotating magnetic field range finder of claim 6, wherein, for a magnetic drill collar sub assembly comprising a permanent magnet drill collar sub assembly including obliquely aligned permanent magnets, functions of separation and direction are defined as:

$$\begin{cases} JRMtop = \dfrac{\mu M}{4\pi(h^2+s^2)^{2.5}} \\ ((2s^2-h^2)\cos\beta\cos\alpha + 3hs\sin\beta) \\ JRMside = \dfrac{\mu M}{4\pi(h^2+s^2)^{1.5}}\cos\beta\sin\alpha \\ JRMforth = \dfrac{\mu M}{4\pi(h^2+s^2)^{2.5}} \\ (3hs\cos\beta\cos\alpha + (2s^2-h^2)\sin\beta) \end{cases}$$

$\mu$ is the magnetic permeability of the medium around the permanent magnet drill collar sub assembly, M is the magnetic moment vector, $\alpha$ is the rotation angle of the permanent magnet drill collar sub assembly, h is the distance from the observation point to RMforward axis, s is the corresponding position of the observation point in RMforward axis.

9. The rotating magnetic field range finder of claim 6, wherein, for a magnetic drill collar sub assembly comprising a permanent magnet drill collar sub assembly including partial perpendicular and partial parallel assembled permanent magnets, functions of separation and direction are defined as:

$$\begin{cases} TRMtop = \dfrac{\mu M}{4\pi(h^2+s^2)^{2.5}}[(2h^2-s^2)\cos\alpha + 3hs] \\ TRMside = \dfrac{\mu M}{4\pi(h^2+s^2)^{1.5}}\sin\alpha \\ TRMforth = \dfrac{\mu M}{4\pi(h^2+s^2)^{2.5}}[3hs\cos\alpha + 2s^2 - h^2] \end{cases}$$

$\mu$ is the magnetic permeability of the medium around the permanent magnet drill collar sub assembly, M is the magnetic moment vector, $\alpha$ is the rotation angle of the permanent magnet drill collar sub assembly, h is the distance from the observation point to RMforward axis, s is the corresponding position of the observation point in RMforward axis.

10. The rotating magnetic field range finder of claim 6, wherein: during measuring the separation between one pair of horizontal wells, when one drill pipe finished, there are two measurement results, and the redundant data is used to improve confidence; and the separation and high spacing pitch corners, the angle between the drill bit axis, and the drilling well axis are measured.

11. The rotating magnetic field range finder of claim 6, wherein, when measuring the distance between the intersection wells and connection wells, a redundancy is calculated by using the two tri-axial fluxgate magnetometers, and real-time calibration is calculated by using the certain distance between the two tri-axial fluxgate magnetometers, providing improved reliability and accuracy of the data.

12. The rotating magnetic field range finder of claim 6, wherein, when measuring the distance between the intersection wells and connection wells, a redundancy is calculated by using the two tri-axial fluxgate magnetometers, and real-time calibration is calculated by using the certain distance between the two tri-axial fluxgate magnetometers, providing improved reliability and accuracy of the data.

13. The rotating magnetic field range finder of claim 1, wherein: using the time waveforms produced by the tri-axial fluxgate magnetometers and time waveform of depth, the rotating magnetic field range finder is configured to create 3D images which present RMtop1, RMside1, RMforward1, RMtop2, RMside2, RMforward2 six magnetic field components versus a bit rotation angle and bit depth; the 3D images present a sum of the squares of three magnetic field components at each position, or sum of the squares of two magnetic field components at each position; separation and direction between the bit and drilled well are determined by reading coordinate values of the peak, valley and isoline correspond with drill bit rotation angle and bit depth, based on: functions of separation and direction between the drill bit and drilled well to the drill bit rotation angle and the bit depth; on magnetic field components at positions of each fluxgate; and on each component calculated by calibration files; wherein RMforward is the rotation axis direction of the permanent magnet drill collar sub assembly, RMtop is the direction from the RMforward axis to the observation point, and RMside direction is according to the right-hand rule.

14. The rotating magnetic field range finder of claim 1, wherein: the magnetic drill collar sub assembly is a permanent magnet drill collar sub assembly including permanent magnets creating the rotating magnetic field; the permanent magnet drill collar sub assembly defines a sub assembly axis aligned with the length of the permanent magnet drill collar sub assembly; and either: the permanent magnets are obliquely assembled within permanent magnet drill collar sub assembly; and permanent magnets are arranged in a vector from N pole to S pole at an angle to the sub assembly axis; or the permanent magnets comprise both perpendicularly aligned permanent magnets and parallel aligned permanent magnets residing within permanent magnet drill collar sub assembly; using the time waveforms produced by the tri-axial fluxgate magnetometers and time waveform of depth, the rotating magnetic field range finder is configured to create 3D images which present RMtop1, RMside1, RMforward1, RMtop2, RMside2, RMforward2 six magnetic field components versus a bit rotation angle and bit depth; the 3D images present a sum of the squares of three magnetic field components at each position, or square sum of two magnetic field components at each position, or other calculations of six magnetic field components at two positions, versus drill bit rotation angle and bit depth; separation and direction between the bit and drilled well are determined by reading coordinate values of the peak, valley and isoline correspond with drill bit rotation angle and bit depth, based on: functions of separation and direction between the drill bit and drilled well to the drill bit rotation angle and the bit depth; on magnetic field components at positions of each fluxgate; and on each component calculated by calibration files; wherein RMforward is the rotation axis direction of the permanent magnet drill collar sub assembly, RMtop is the direction from the RMforward axis to the observation point, and RMside direction is according to the right-hand rule.

15. The rotating magnetic field range finder of claim 14, wherein: for the obliquely assembled permanent magnets, functions of separation and direction are:

$$\begin{cases} TRMtop = \dfrac{\mu M}{4\pi(h^2+s^2)^{2.5}}[(2h^2-s^2)\cos\alpha + 3hs] \\ TRMside = \dfrac{\mu M}{4\pi(h^2+s^2)^{1.5}}\sin\alpha \\ TRMforth = \dfrac{\mu M}{4\pi(h^2+s^2)^{2.5}}[3hs\cos\alpha + 2s^2 - h^2] \end{cases}$$

μ is the magnetic permeability of the medium around the permanent magnet drill collar sub assembly, M is the magnetic moment vector, α is the rotation angle of the permanent magnet drill collar sub assembly, h is the distance from the observation point; and for the both perpendicularly aligned permanent magnets and parallel aligned permanent magnets, the functions of separation and direction are:

$$\begin{cases} JRMtop = \dfrac{\mu M}{4\pi(h^2+s^2)^{2.5}} \\ \qquad ((2s^2-h^2)\cos\beta\cos\alpha + 3hs\sin\beta) \\ JRMside = \dfrac{\mu M}{4\pi(h^2+s^2)^{1.5}}\cos\beta\sin\alpha \\ JRMforth = \dfrac{\mu M}{4\pi(h^2+s^2)^{2.5}} \\ \qquad (3hs\cos\beta\cos\alpha + (2s^2-h^2)\sin\beta) \end{cases}$$

μ is the magnetic permeability of the medium around the permanent magnet drill collar sub assembly, M is the magnetic moment vector, α is the rotation angle of the permanent magnet drill collar sub assembly, h is the distance from the observation point to RMforward axis, s is the corresponding position of the observation point in RMforward axis.

\* \* \* \* \*